May 19, 1959 — A. ROMOLT — 2,887,197
HANDLE FOR LUGGAGE
Filed Feb. 19, 1958

INVENTOR.
ABE ROMOLT
BY Threedy & Threedy
HIS ATTORNEYS.

2,887,197

HANDLE FOR LUGGAGE

Abe Romolt, Chicago, Ill., assignor to National Leather Handle Company, Inc., Chicago, Ill., a corporation of Illinois Application February 19, 1958, Serial No. 716,160

2 Claims. (Cl. 190—57)

This invention relates to new and useful improvements in a handle for luggage as is used on travel bags, suit cases, brief cases and the like.

A principal object of my invention is in the provision in a device of this character of a means for securing together in handle forming arrangement oppositely disposed portions of a blank of material from which the handle is formed.

Another object of my invention is in the provision in a device of this character of an arrangement of parts which frictionally secure together the oppositely disposed portions of the blank of material from which the handle is formed when such blank is folded into a handle forming position.

Yet another object of my invention is in the provision of a handle of this character that provides a light-weight strain and pressure-resistant post handle of U-type made from a ring-shaped blank of material.

Yet another object of my invention is the provision of forming a handle that is attractive in appearance, durable in use and inexpensive in manufacture.

Other objects will appear hereinafter.

The invention consists in the novel combination and arrangement of parts to be hereinafter described and claimed.

The invention will be best understood by reference to the accompanying drawings showing the preferred form of construction, and in which.

Figure 2:
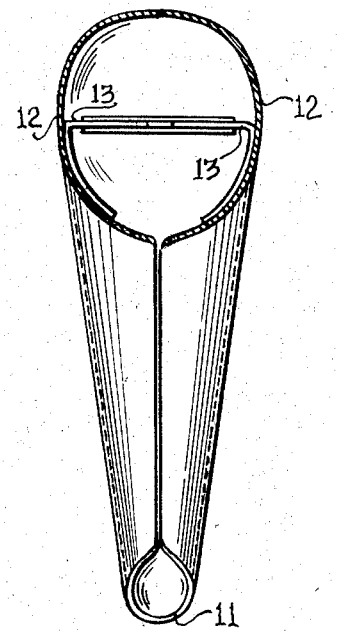
Fig. 2 is a detail sectional view taken through a handle made from a blank of material.

In the construction of the handle an approximate ring-shaped one piece blank body portion 10 formed of a resilient metal is cut, so as to provide diametrically opposed elongated reduced portions 11, 11.

The blank 10, upon opposite sides of the reduced portions 11, 11 is die-pressed into substantially channel shaped handle forming portions 12, 12. These handle portions 12, 12 are then folded substantially along a line connecting the longitudinal centers of the reduced portions 11, 11 until the channel shape handle portions 12, 12 are brought together into opposed confronting relation as shown in sectional views Figs. 2 and 5.

Each of the channel portions 12, 12 is provided on its inner face with diametrically opposed laterally extending flange members 13, 13. These members 13, 13 are of a length sufficient to have their free edges spaced apart when said channel portions 12, 12 are folded together.

Figure 5:
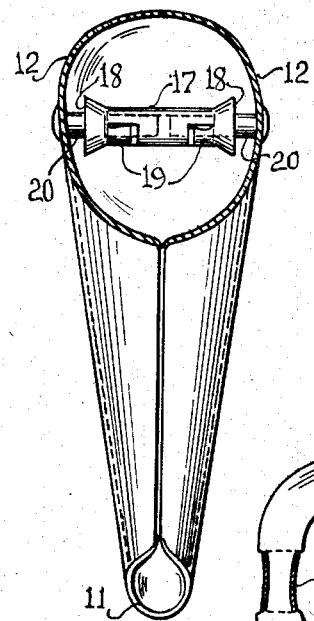
Fig. 5 is a detail sectional view of a handle made from the blank of material and showing a modified construction thereof.

I provide a U-shaped clip means 14 comprising oppositely disposed flared ends 15, 15. The body of this clip means 14 is formed to provide spring bias elements 16. The members 13, 13 of the channel portions 12, 12 are frictionally inserted into said flared ends 15, 15 of the clip means 14 when said channel portions 12, 12 are folded together as seen in Figs. 2 and 5. The spring bias elements 16 secure said channel portions 12, 12 in confronting facial abutment by frictionally engaging the members 13, 13 when they are inserted in opposite flared ends 15, 15 of the clip means 14 as seen in Fig. 2.

In the actual assembling of the handle, the clip means 14 is positioned on one of the members 13 and upon the folding together of the channel portions 12, 12, the other member 13 is inserted in the opposite flared end 15 of the clip means 14 completing the handle assembly.

Figure 3:
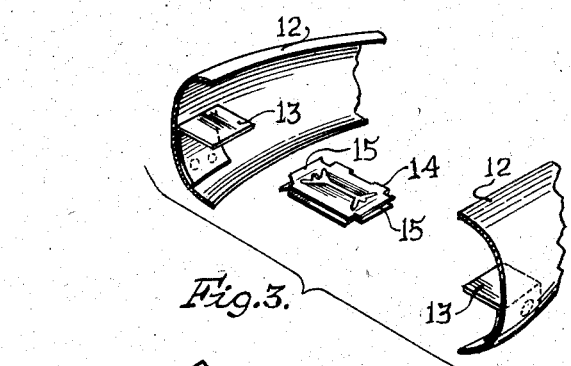
Fig. 3 is a fragmentary sectional view showing the parts of my handle in an exploded relation with respect to each other.
Figure 4:
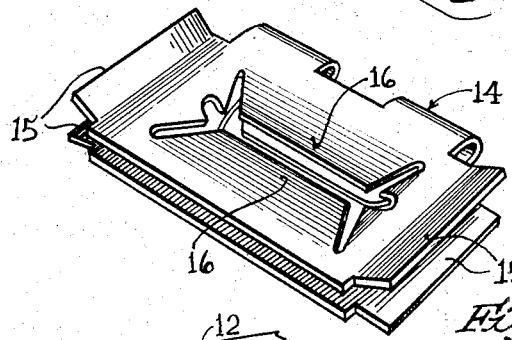
Fig. 4 is a perspective view of the frictional clip employed in my handle.
Figure 6:
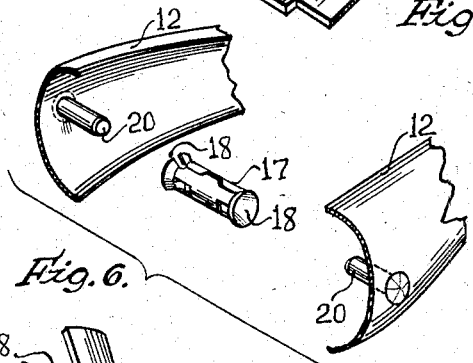
Fig. 6 is a fragmentary sectional view showing the parts of the modified structure in exploded relation to each other.
Figure 7:
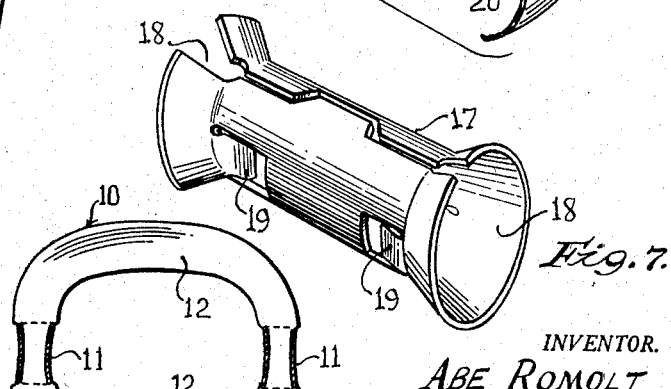
Fig. 7 is a perspective view of the modified frictional clip as employed in the modified handle.
Figure 1:
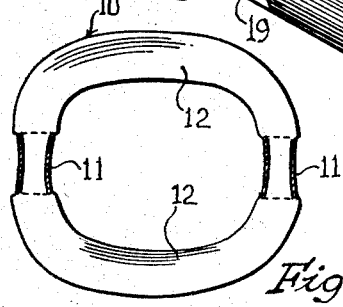
Fig. 1 is a plan view of the ring-shaped blank of material from which the handle is formed.

Referring to Figs. 5, 6 and 7, I show a modified clip means. This modified clip means comprises a cylinder 17. This cylinder 17 has oppositely disposed flared openings 18, 18, and has formed therein intermediate these openings spring bias elements 19. In place of the members 13, 13 of the construction shown in Figs. 2, 3 and 4 I substitute inwardly extending oppositely disposed studs 20, 20. These studs 20, 20 are inserted in the cylinder 17 in the same manner and for the same purpose as were the members 13, 13 frictionally inserted in the clip means 14 hereinbefore described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a handle for luggage or the like, a body portion formed of a channeled substantially ring-shaped blank folded upon itself to form oppositely disposed confronting channeled sections, each of said sections providing oppositely disposed studs within the channel thereof for cooperating with a means for securing said sections in confronting relation with respect to each other so as to form a handle, clip means for receiving said studs for securing said sections in confronting relation with respect to each other, said clip means comprising a cylindrical member having oppositely disposed flared ends adapted to frictionally receive said studs, said member being of a length less than the distance between said channeled sections when they are folded into confronting relation.

2. In a handle for luggage or the like, a body portion formed of a channeled substantially ring-shaped blank folded upon itself to form oppositely disposed confronting channeled sections, each of said sections providing oppositely disposed studs within the channel thereof for cooperating with a means for securing said sections in confronting relation with respect to each other so as to form a handle, a cylindrical clip means having oppositely disposed flared ends adapted to receive said studs, said cylindrical clip means providing intermediate the flared ends thereof spring bias elements for frictionally receiving said studs therebetween for securing said sections in confronting relation with respect to each other.

References Cited in the file of this patent

UNITED STATES PATENTS

| | | |
|---|---|---|
| 2,528,831 | Jaffe | Nov. 7, 1950 |
| 2,703,160 | Lifton | Mar. 1, 1955 |
| 2,771,167 | Lifton | Nov. 20, 1956 |